United States Patent [19]

Collins

[11] Patent Number: 4,577,237
[45] Date of Patent: Mar. 18, 1986

[54] ERROR CORRECTION IN DIGITAL TELEVISION SIGNALS

[75] Inventor: Mark C. Collins, Basingstoke, England

[73] Assignee: Sony Corporation, Tokyo, Japan

[21] Appl. No.: 523,874

[22] Filed: Aug. 17, 1983

[30] Foreign Application Priority Data

Aug. 20, 1982 [GB] United Kingdom ............... 8224013

[51] Int. Cl.[4] ............................................ H04N 5/782
[52] U.S. Cl. .................................. 358/336; 360/10.3; 371/40
[58] Field of Search ............... 360/10.1, 10.3, 36.2, 360/38.1; 358/335, 336; 371/38, 40, 41

[56] References Cited

U.S. PATENT DOCUMENTS 4,293,879 10/1981 Heitmann et al. ................ 360/10.3
4,451,920 5/1984 Hoshimi et al. .................. 360/38.1
4,453,250 6/1984 Hoshimi et al. .................. 360/38.1
4,467,373 8/1984 Taylor et al. ..................... 360/38.1

Primary Examiner—Donald McElheny, Jr.
Attorney, Agent, or Firm—Lewis H. Eslinger; Alvin Sinderbrand

[57] ABSTRACT

A method of correcting errors in a digital television signal comprises forming the data words of the television signal into correction units each of which comprises a plurality of the data words and a parity word formed therefrom, and recording and subsequently reproducing on a digital video tape recorder the correction units. On slow motion reproduction from the digital video tape recorder a syndrome generator derives a syndrome from the data words and the respective parity word of each reproduced correction unit. An error counter counts the number of valid words in each reproduced correction unit. If this count is one less than the total number of words in the correction unit, the syndrome is used to correct the data word which is in error, and if the count is equal to the total number of words in the reproduced correction unit and the syndrome is not equal to zero, each of the data words in the reproduced correction unit is flagged as being in error.

8 Claims, 5 Drawing Figures

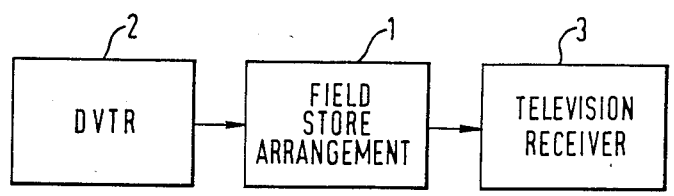
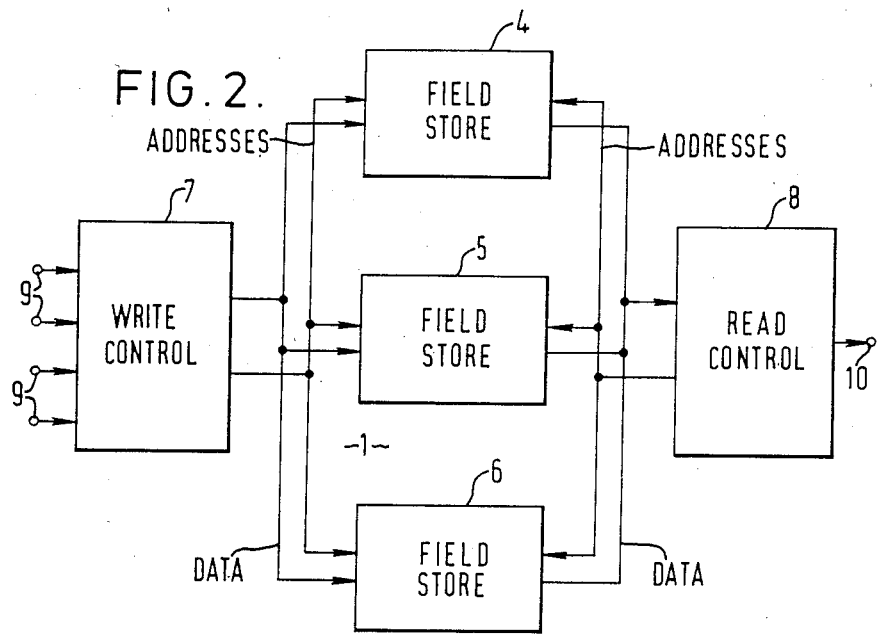
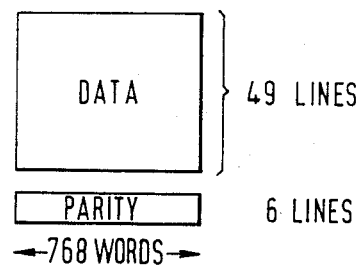

ERROR CORRECTION IN DIGITAL TELEVISION SIGNALS

BACKGROUND OF THE INVENTION

1. Field of the Invention

This invention relates to error correction in digital television signals, and more particularly to vertical parity correction.

2. Description of the Prior Art

In a digital video tape recorder (DVTR), an incoming television signal to be recorded is sampled, the samples are pulse code modulation coded into digital form, the resulting digital data signals are recorded on a magnetic tape and subsequently reproduced, the reproduced digital data signals are decoded, and the decoded signals are used to form an analog signal corresponding to the original television signal. If errors occur in the handling of the digital signals, for example due to noise or tape drop-out occurring in the DVTR, the digital signals are corrupted and then the reformed analog television signal does not correspond exactly to the original analog television signal, and a resulting television picture is degraded.

Such errors and their detrimental effects can be reduced by correction and concealment. Correction involves the production and use of additional data signals purely for the purposes of error detection and correction, these additional data signals otherwise being redundant. While correction provides good results, it cannot generally be used as the sole means of dealing with errors, because a comprehensive error correction capability would require an excessive amount of additional data which might overload the data handling paths or raise the data rate to an unacceptable level. Concealment comprises the replacement of corrupted data signals by data signals generated using available uncorrupted data signals. This method relies largely for accuracy on the strong correlation that exists in a television signal.

When a DVTR is reproducing in the normal reproducing mode, that is at the normal replay speed, the data is being recovered from the tape at the same overall rate that is required for display on the television receiver. It is only necessary to provide time-base correction to synchronize the data reproduced from the tape with stable output synchronizing signals. Increasingly, however, there is a requirement for reproduction at non-normal speeds. These are generally referred to as special reproduction modes and include still, slow motion, reverse motion and the so-called shuttle mode which comprises the whole range of speeds from fast forward to fast reverse and which is of particular utility in searching and editing.

Reproduction of a digital television signal at non-normal speeds implies some sort of temporary storage of the reproduced data prior to supply to a television receiver, and the present invention is based on the realisation that this temporary storage can additionally be used to effect improved vertical parity correction.

SUMMARY OF THE INVENTION

One object of the present invention is to provide a method of error correction in a digital television signal which gives improved correction during slow motion reproduction.

Another object of the present invention is to provide a method of error correction in a digital television signal wherein errors are counted and a syndrome derived from a plurality of data words is used for error correction only if a single error is counted.

Another object of the present invention is to provide apparatus for correcting errors in a digital television signal which gives improved correction during slow motion reproduction by counting errors.

According to the present invention there is provided a method of error correction in a digital television signal, the method comprising the steps of:

forming the data words of the digital television signal into correction units each of which comprises a plurality of said data words and a parity word formed from said plurality of said data words; and recording and subsequently reproducing said correction units;

and wherein, on slow motion reproduction:

a syndrome is derived from said data words and said parity word of each reproduced correction unit;

the number of valid words in each said reproduced correction unit is counted;

when said count is one less than the total number of said words in said reproduced correction unit, said syndrome is used to correct the data word in said reproduced correction unit which is in error; and when said count is equal to the total number of said words in said reproduced correction unit and said syndrome is not equal to zero, each of said data words in said reproduced correction unit is flagged as being in error.

According to the present invention there is also provided apparatus for correcting errors in a digital television signal, the apparatus comprising:

means for forming the data words of the digital television signal into correction units, each of which comprises a plurality of said data words and a parity word formed from said plurality of said data words; a digital video tape recorder for recording and subsequently reproducing said correction units; and a field store arrangement operative on slow motion reproduction of said digital video tape recorder, to derive a syndrome from said data words and said parity word of each reproduced correction unit, to count the number of valid words in each said reproduced correction unit, when said count is one less than the total number of said words in said reproduced correction unit to use said syndrome to correct the data word in said reproduced correction unit which is in error, and when said count is equal to the total number of said words in said reproduced correction unit and said syndrome is not equal to zero to flag each of said data words in said reproduced correction unit as being in error.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a very much simplified block diagram of a digital television reproducing apparatus;

FIG. 2 is a block diagram showing in more detail a field store arrangement forming part of the apparatus of FIG. 1;

FIG. 3 illustrates a vertical parity format;

DESCRIPTION OF THE PREFERRED EMBODIMENTS

Figure 4:
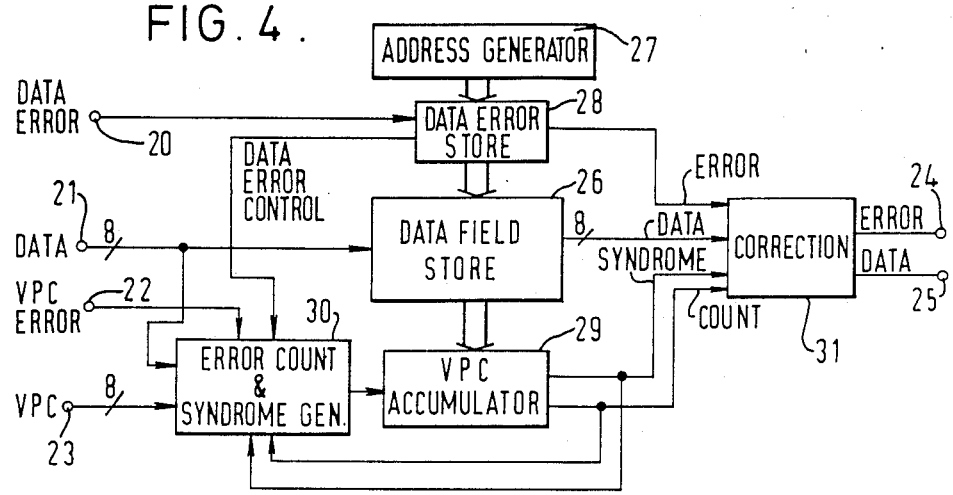
FIG. 4 is a block diagram showing in more detail a field store forming part of the arrangement of FIG. 2.

Referring to FIG. 1, the central part of the digital television apparatus to be described is a field store arrangement 1 which forms a buffer store between a DVTR 2 and a television receiver 3 on which a television picture derived from a television signal reproduced from the DVTR 2 is to be displayed. The DVTR 2 has a normal reproduction mode corresponding to normal motion reproduction and special reproduction modes corresponding to slow (which includes still) motion and fast motion reproduction. In the normal reproduction mode, the data is being recovered from the magnetic tape in the DVTR 2 at the same overall rate; that is at the same rate apart only from time-base fluctuations, as required for display on the television picture.

Referring to FIG. 2, this shows the field store arrangement 1 in more detail. The field store arrangement 1 comprises three field stores 4, 5 and 6, a write control device 7 and a read control device 8. Input terminals 9 which are connected to the DVTR 2 (FIG. 1) are also connected to the write control device 7 which supplies addresses and data over separate paths to each of the field stores 4, 5 and 6.

The field stores 4, 5 and 6 are identical and each is capable of storing digital signals relating to one field of a television signal. For PAL systems, assuming 300 active lines, 1536 samples per line, and each sample pulse code modulation coded to form an 8-bit word, this means that each field store 4, 5 and 6 must be capable of storing at least 3.7 million bits. (The figures for the NTSC system are of the same order.) The field stores 4, 5 and 6 can conveniently be formed of 64 k random access memories (RAMs) and in one example of the field store arrangement 1 each field store 4, 5 and 6 comprises sixty-four such RAMs. A further eight such RAMs are required for a ninth bit of each word, this bit forming an error flag and being referred to in more detail below.

The read control device 8 supplies addresses to and receives data from each of the field stores 4, 5 and 6 over separate paths, and output data are supplied by the read control device 8 to an output terminal 10 which is connected to the television receiver 3 (FIG. 1).

Before considering the operation in detail it must be realised that it is not possible to display more data than is satisfactorily recovered at high speeds, and that at low speeds it must be possible to use data repeatedly. At non-normal tape speeds the off-tape data format and the data sequence may be widely different from normal, and this of itself dictates the need for some form of buffer storage to assemble the data and to ensure the conceptual view that is expected in the reproduced picture.

In the field store arrangement 1, the read control device 8 will continue to read from one field store 4, 5 or 6 until all the data in that field store 4, 5 or 6 has been read and only then will it switch to another field store. The use of three field stores 4, 5 and 6 makes it unnecessary to write into and read from the same field store 4, 5 or 6 at the same time, despite different reproduction speeds and time-base errors of the reproduced data. Moreover, the use of the three field stores 4, 5 and 6 avoids clashes between requirements to write into and read from the same field store 4, 5 or 6, produces pictures which are conceptually better, and saves a considerable amount of hardware elsewhere in the reproduction system.

The writing and reading operations associated with the field store arrangement 1 will now be briefly described.

In the normal reproduction mode, data is first read from the field store 4 while being written into the field stores 5 and 6 simultaneously. When all the data has been read from the field store 4, data is read from the field store 5 while being written into the field stores 6 and 4 simultaneously. Reading and writing continues to rotate around the field stores 4, 5 and 6 cyclically in this way.

Writing into the field stores 4, 5 and 6 is synchronous with the read side field synchronizing signals. Moreover, data which is recognized to be in error is not written into the field stores 4, 5 and 6, so that the existing data is left intact. This means that when the data comes to be read it will consist of correct data from the current field and data from the previous field in the place of any errors. This improves the concealment possibilities considerably by making data available in the correct physical position, but temporally displaced from the current data.

In the slow motion reproduction mode, which covers speeds from zero to plus or minus the normal reproduction speed, data is read from the field store 4 repeatedly while data is being written into the field store 5. When the field store 5 is full, writing continues in the field store 6. Then, when reading of a field from the field store 4 is next completed, reading moves to the field store 5. This makes the field store 4 available to be written in as soon as the field store 6 is full. Reading and writing continues to rotate around the field stores 4, 5 and 6 cyclically in this way.

Finally, in the fast motion reproduction mode, data is read from the field stores 4 and 5, while being written into the field store 6. When a complete field has been read, the reading switches to the field stores 5 and 6, while the field store 4 is written into. Reading and writing continues to rotate around the field stores 4, 5 and 6 cyclically in this way. Because reading is from two field stores simultaneously in this mode, the read control device 8 (FIG. 2) is receiving two data streams simultaneously. However, both these data streams will be to some extent imperfect, particularly at higher tape speeds where mis-tracking of the magnetic reading heads relative to the magnetic tape will become more severe, and where cross-tracking will occur more frequently. The data which is actually used is derived by a combination of selection from and concealment using the two data streams.

In all three of these modes the writing of data into the field store arrangement 1 will be totally asynchronous with the reading out of the data, and this facilitates time-base correction.

Vertical parity correction is effected in the normal and slow motion reproduction modes, but not in the fast mode reproduction mode, because data from several different fields will be stored in the same field store 4, 5 or 6. Concealment is effected using data from the current and previous fields.

An example of the format used for the vertical parity is indicated in FIG. 3. In this format, the basic block of data to which the vertical parity is applied is one half of each of forty-nine successive horizontal scan lines. In each block the words in corresponding vertical positions are modulo-2 summed to form six vertical parity words for each such column. Each block therefore has associated with it six times 768 vertical parity words. This will be further described below.

Further correction techniques may also be used. For example, the natural order of the samples along at least one horizontal scan line or over the whole vertical parity block may be shuffled prior to recording and de-shuffled after reproduction. This is because burst errors tend to be more common than individual errors, and since concealment techniques generally rely for their effectiveness in correcting error samples on there being adjacent samples which are not in error, a burst error affecting a sequence of samples along a scan line can be difficult to conceal. However, by shuffling and de-shuffling the natural order of the samples, the error samples resulting from a burst error can be distributed, so that they are each much more likely to be surrounded by correct samples.

The vertical parity will now be considered in more detail. Basically, a known even parity scheme for burst error correction is used. Prior to recording, the even parity of a plurality of data words in the block of data is derived. Thus, for example, the data words in corresponding positions in every sixth line of the data block form part of a correction unit and are modulo-2, that is exclusive-OR, summed to form a vertical parity word which completes the correction unit. By taking words from corresponding positions, the data words in each correction unit are vertically aligned in the television picture, but this is not essential. If the data words in the correction unit are designated D1, D2, etc. ..., then the vertical parity word C is given by:

$$D0 \oplus D1 \oplus D2 \oplus D3 \oplus D4 \oplus \ldots = C \quad (1)$$

On recording, each of these words, including the vertical parity word C, is separated by as large a time as possible; by six lines in the above example, and typically by four to ten lines. In consequence, a burst error which is not longer than the separation of the data words within each correction unit will only affect one data word in the correction unit.

On reproduction, a separate error detection scheme is used prior to the application of the vertical parity correction, and each data word or vertical parity word found to be in error is flagged. This is done by associating with each data word a ninth bit which when say "0" forms an error flag and when "1" indicates no error. In the previously known methods the number of errors are counted as a vertical parity syndrome S is generated. When only one error is counted, the syndrome S indicates the true value of the error word and can therefore be substituted for it. Thus if the error word is D2, it is not included when generating the syndrome S:

$$D0 \oplus D1 \oplus D3 \oplus D4 \oplus \ldots \oplus C = S \quad (2)$$

and then:

$$S = D2 \quad (3)$$

If more than one error is counted, the correction cannot be applied and errors are dealt with subsequently, for example, by concealment.

The present invention is concerned with two extensions of the above known methods.

The first extension is concerned with aiding error detection. The above-described method is very dependent upon the effectiveness of the initial error detection scheme which, inevitably, will not be infallible. Occasionally, therefore, undetected errors will be present, but it is possible to use the correction method to detect some of these errors. Thus when the total number of errors detected is zero, the syndrome S should also be zero, because:

$$D0 \oplus D1 \oplus D2 \oplus D3 \oplus D4 \oplus \ldots \oplus C = S = 0 \quad (4)$$

If however the syndrome S does not equal zero, then there is a very high probability that an undetected error exists within the correction unit. For example, if the data word D3 has an error E then:

$$D0 \oplus D1 \oplus D2 \oplus (D3 \oplus E) \oplus D4 \oplus \ldots \oplus C = E \quad (5)$$

Although the fact that the syndrome S is not zero, but is equal to the error E, this does not indicate which of the data words is in error and the action required is to associate error flags with all the data words within the correction unit, this being preferable to allowing an undetected error to pass. The data words thus flagged can then be concealed.

The second modification is to the operation of the veritcal parity correction when the DVTR is operating in slow motion. In the slow motion mode the reproducing heads cross the tracks and the data relating to respective fields are re-assembled in the field store arrangement described above. In the slow motion mode it is likely that most data words and vertical parity words will be presented to each field store several times. Clearly the syndrome generation would be invalidated if any words were to be used more than once, and any attempt to count errors would be misleading. The circuitry is therefore modified to ensure, firstly, that each valid word, that is, words not having an error flag, is used once only, and, secondly that a count of valid, rather than error words is made to determine whether correction can be applied.

Referring to FIG. 4, this shows one of the field stores 4, 5 or 6 of the arrangement of FIG. 2 in more detail. The field store has input terminals 20, 21, 22 and 23 to which data error flags, data words, vertical parity (VPC) error flags and vertical parity words respectively are supplied. The data words supplied to the input terminal 21 are delayed by six lines relative to the vertical parity words supplied to the input terminal 23 so that the vertical parity word for a correction unit is available at the same time as the final data word of that correction unit. The field store has output terminals 24 and 25 from which are derived output error flags and output data words respectively.

The field store comprises a data field store 26 which is addressed by an address generator 27 by way of a data error flag store 28. Associated with the data field store 26 is a vertical parity accumulator 29 controlled by an error counter and syndrome generator 30.

As indicated above, each valid data word is used once only and so each valid data word is written once only in the data field store 26, the writing of invalid words being prevented by the data error flag store 28. Moreover, the data error flag provides the control for the vertical parity circuitry, so as not only to ensure that only valid data words are written in the data field store 26, but also that valid data words are not written again. Before starting the write sequence into the data field store 26, all the data error flags are set, and writing into both the data field store 26 and the VPC accumulator 29 is enabled only when the error stored flag is set and the input error flag is reset.

The output terminals 24 and 25 are connected to a correction unit 31 to which is supplied an error input from the data error flag store 28, data from the data field store 26, the syndrome S from the VPC accumulator 29 and the error count from the VPC accumulator 29.

When the data words are to be read from the data field store 26, the available information is considered as follows, it being assumed that T is the total number of words within each correction unit.

(1) If there is an indication that there is a data error, and additionally the valid word count is $T-1$, then the required correction is the replacement of the data word flagged as being in error by replacing it by the syndrome S.

(2) If no word is flagged as being in error and the valid word count is equal to T, but the syndrome S does not equal zero, then it is assumed that there is an undetected error among the data words, and all the data words in the correction unit are flagged as being in error.

(3) In all other cases no action is taken.

Despite the effect of cross-tracking when replaying in the slow motion mode, the total proportion of valid data words recovered can be very high. With the method just described it is possible to eliminate the few remaining errors almost completely, and to detect the occasional previously undetected errors.

Figure 5:
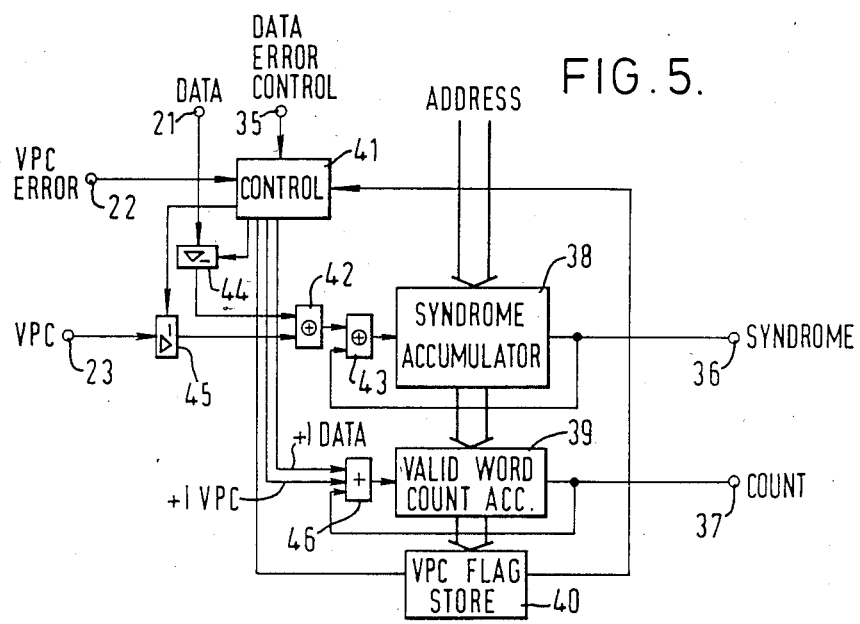
FIG. 5 is a block diagram of a vertical parity correction accumulator and error count and syndrome generator forming part of the field store of FIG. 4.

FIG. 5, to which reference is now made, shows the VPC accumulator 29 and the error counter and syndrome generator 30 of FIG. 4 in more detail. The arrangement has four input terminals, comprising input terminals 21, 22 and 23 corresponding to the similarly numbered input terminals in FIG. 4, and an input terminal 35 connected to the data error flag store 28 of FIG. 4. The arrangement also has output terminals 36 and 37 which supply the syndrome and the error count to the correction unit 31 of FIG. 4.

The arrangement also comprises a syndrome accumulator 38, a valid word count accumulator 39, a VPC flag store 40 and a control unit 41. Addresses are supplied to the syndrome accumulator 38 from the data field store 26 of FIG. 4. Modulo-2 adders 42 and 43 derive the syndrome S. The adder 42 receives inputs from the data input terminal 21 by way of a gate 44 and from the VPC input terminal 23 by way of a gate 45. The adder 43 receives inputs from the adder 42 and from the output of the syndrome accumulator 38. The valid word count accumulator 39 receives inputs from a binary adder 46. For every valid data word and every valid vertical parity word used in the syndrome generation one is added to the valid word count. Separate inputs to the adder 46 are provided for data words and vertical parity words as two valid words can arrive simultaneously.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of error correction of a digital television signal consisting of sequential data words, the method comprising the steps of:
   selecting a predetermined number of said data words;
   deriving a parity word from the selected data words;
   forming a correction unit including said selected data words and said parity word;
   recording said correction unit;
   reproducing said correction unit for slow motion display;
   identifying validly reproduced ones and invalidly reproduced ones of the reproduced words of the reproduced correction unit, and flagging each word identified as being invalidly reproduced;
   deriving a syndrome from the reproduced parity word and selected ones of the reproduced data words, said syndrome being equal to zero when all said reproduced words are validly reproduced;
   counting the number of said validly reproduced words; and
   performing alternative error correction steps in dependence on said number of validly reproduced words, said alternative error correction steps including:
   when said number of reproduced words identified as being valid is one less than said predetermined number, such that only one reproduced data word is invalidly reproduced, using said syndrome to correct the one invalidly reproduced word; and
   when said number of reproduced words identified as being valid equals said predetermined number and said syndrome does not equal zero, flagging each of said reproduced data words as being in error.

2. A method according to claim 1; wherein said step of identifying includes subjecting said data words and said parity words to an error detection process prior to derivation of said syndrome, each said data word and said parity word found to be invalidly reproduced being flagged as being in error to identify the same as being invalidly reproduced.

3. A method according to claim 2; wherein when one only of said data words to be used to derive said syndrome is flagged as being in error, said erroneous data word is omitted in deriving said syndrome.

4. A method according to claim 1; wherein said digital television signal includes a plurality of horizontal scan lines, each including a plurality of said sequential data words, and wherein said parity word is derived by modulo-2 addition of one said data word from each of a plurality of said horizontal scan lines of said digital television signal.

5. A method according to claim 4 wherein each said horizontal scan line used in deriving said parity word for a correction unit is separated by four to ten lines from any other said horizontal scan line used in deriving said parity word for said correction unit.

6. A method according to claim 1; further including the step of storing said reproduced data words identified as being validly reproduced in a field store.

7. A method according to claim 1; wherein successive groups each including said predetermined number of said data words are successively selected, each successive group of selected data words being subsequently processed in accordance with said method.

8. Apparatus for correcting errors in a digital television signal consisting of sequential data words, the apparatus comprising:
  means for forming the data words of the digital television signal into a plurality of correction units, each of which has a total number of words including a plurality of said data words and a parity word formed from a respective plurality of said data words;
  digital video recording/reproducing means for recording and subsequently reproducing said correction units, said digital video recording/reproducing means being selectively operative for slow-motion reproduction; and
  field store means operative on slow-motion reproduction of said digital video recording/reproducing means for correcting errors in the reproduced data words, said field store means including means for deriving a syndrome from selected ones of said data words and said parity word of each reproduced correction unit, means for providing error flag signals identifying validly reproduced ones and invalidly reproduced ones of said data words, means for providing a count of the number of reproduced words identified as being validly reproduced in each said reproduced correction unit, and means for correcting errors in said reproduced words in response to said count, said means for correcting being operative when said count is one less than the total number of said words in said reproduced correction unit to use said syndrome to correct the data word in said reproduced correction unit which is in error, and said means for correcting being operative when said count is equal to the total number of said words in said reproduced correction unit and said syndrome is not equal to zero to flag each of said data words in said reproduced correction unit as being in error.

* * * * *